United States Patent
Herlitz et al.

(10) Patent No.: US 9,333,977 B2
(45) Date of Patent: May 10, 2016

(54) MULTIPURPOSE WAGON

(71) Applicant: Radio Flyer Inc., Chicago, IL (US)

(72) Inventors: Todd Herlitz, Glenview, IL (US); Emily Byrne, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 14/492,955

(22) Filed: Sep. 22, 2014

(65) Prior Publication Data

US 2015/0084298 A1    Mar. 26, 2015

Related U.S. Application Data

(60) Provisional application No. 61/880,480, filed on Sep. 20, 2013.

(51) Int. Cl.
*B62B 3/02*     (2006.01)
*B62B 3/00*     (2006.01)
*B62B 5/08*     (2006.01)
*B62B 7/00*     (2006.01)

(52) U.S. Cl.
CPC . *B62B 3/02* (2013.01); *B62B 3/007* (2013.01); *B62B 5/082* (2013.01); *B62B 7/008* (2013.01); *B62B 2202/023* (2013.01)

(58) Field of Classification Search
CPC .......... B62B 3/007; B62B 3/02; B62B 5/082; B62B 2501/065; B62B 7/008; B62B 2206/006; B62B 2206/06; B62B 2202/023
USPC .................. 280/87.021, 87.01; D21/425, 536
See application file for complete search history.

(56) References Cited

U.S. PATENT DOCUMENTS

| | | | |
|---|---|---|---|
| 1,371,198 | A | 3/1921 | Daum |
| 1,465,211 | A | 8/1923 | Dunkelberger |
| 1,489,443 | A | 4/1924 | Kelly |
| 1,650,163 | A | 11/1927 | Taylor |
| 1,771,813 | A | 7/1930 | Norman |

(Continued)

FOREIGN PATENT DOCUMENTS

| | | |
|---|---|---|
| EP | 1847437 | 10/2007 |
| WO | WO2007/053018 | 5/2007 |

(Continued)

OTHER PUBLICATIONS

Step 2 Wagon: Retrieved on Nov. 12, 2010 from http://www.littletikesplay.com/step2/step-2-wagon-for-two-plus-willow-green.html.

(Continued)

*Primary Examiner* — John Walters
*Assistant Examiner* — Brian Swenson
(74) *Attorney, Agent, or Firm* — McDermott Will & Emery LLP

(57) ABSTRACT

A multipurpose wagon having a wagon body, front and rear wheels and a handle. The wagon body has a front portion and a rear portion, the handle being coupled to the front portion, a front wall adjacent the front portion and a rear wall adjacent the rear portion. Additionally, the wagon body has a first sidewall extending between the front wall and the rear wall along one side of the wagon body, and a second sidewall extending between the front wall and the rear wall along an opposing side of the wagon body. The first sidewall has a panel that is removable from the first side of the wagon body and connectable to the second sidewall of the wagon body.

16 Claims, 7 Drawing Sheets

(56) References Cited

U.S. PATENT DOCUMENTS

| | | |
|---|---|---|
| 1,820,466 A | 8/1931 | Lieblein |
| 2,020,766 A | 11/1935 | Brown |
| 2,471,553 A | 5/1949 | Zuckerman |
| 2,532,004 A | 11/1950 | Zepp |
| 2,563,995 A | 8/1951 | East |
| 2,575,189 A | 11/1951 | Schmidt |
| 2,676,054 A | 4/1954 | Pasin |
| 2,984,514 A | 5/1961 | Lemley |
| 3,116,935 A | 1/1964 | Mitchin et al. |
| 3,162,460 A | 12/1964 | Davidson |
| 4,227,709 A | 10/1980 | Gradwohl et al. |
| 4,265,461 A | 5/1981 | Okubo |
| 4,449,322 A | 5/1984 | Blumenthal |
| 4,706,986 A | 11/1987 | Kassai |
| 4,735,426 A | 4/1988 | McConnell |
| 4,741,552 A | 5/1988 | Kassai |
| 4,746,140 A | 5/1988 | Kassai |
| 4,763,907 A | 8/1988 | Raymond |
| 4,796,909 A | 1/1989 | Kirkendall |
| 4,811,968 A | 3/1989 | Bolden |
| 4,824,137 A | 4/1989 | Bolden |
| 4,856,810 A | 8/1989 | Smith |
| 4,878,682 A | 11/1989 | Lee |
| 4,887,836 A | 12/1989 | Simjian |
| 4,930,831 A | 6/1990 | Valiga et al. |
| 5,050,900 A | 9/1991 | Lee |
| 5,333,893 A | 8/1994 | Chen |
| 5,360,222 A | 11/1994 | Bro et al. |
| 5,423,592 A | 6/1995 | Spurrier et al. |
| 5,480,180 A | 1/1996 | Fuller et al. |
| D369,629 S | 5/1996 | Pasin et al. |
| 5,529,323 A | 6/1996 | Vom Braucke et al. |
| 5,538,267 A | 7/1996 | Pasin et al. |
| D382,309 S | 8/1997 | Brown et al. |
| 5,669,617 A | 9/1997 | Pasin et al. |
| D389,877 S | 1/1998 | Pasin |
| 5,833,251 A | 11/1998 | Peck |
| 5,857,695 A | 1/1999 | Crowell |
| 5,876,049 A | 3/1999 | Spear et al. |
| 5,911,432 A | 6/1999 | Song |
| 5,915,723 A | 6/1999 | Austin |
| 5,947,493 A | 9/1999 | Pasin et al. |
| 5,957,482 A * | 9/1999 | Shorter ............... 280/639 |
| 6,010,145 A | 1/2000 | Liu |
| 6,079,720 A | 6/2000 | Spear et al. |
| 6,079,777 A | 6/2000 | Simmons et al. |
| 6,142,491 A | 11/2000 | Darling, III |
| 6,164,671 A | 12/2000 | Darling, III |
| 6,220,611 B1 | 4/2001 | Shapiro |
| 6,270,092 B2 | 8/2001 | Darling, III |
| 6,318,740 B1 | 11/2001 | Nappo |
| D458,648 S | 6/2002 | Chiappetta et al. |
| 6,446,981 B1 | 9/2002 | Wise et al. |
| 6,488,293 B1 | 12/2002 | Mitchell et al. |
| 6,491,318 B1 | 12/2002 | Galt et al. |
| 6,497,424 B2 | 12/2002 | Gartner et al. |
| 6,499,750 B1 | 12/2002 | Michelau |
| 6,513,827 B1 | 2/2003 | Barenbrug |
| 6,536,796 B1 | 3/2003 | Solomon |
| 6,561,529 B2 | 5/2003 | Darling, III |
| 6,581,945 B1 | 6/2003 | Shapiro |
| 6,601,860 B2 | 8/2003 | Potter |
| 6,641,149 B2 * | 11/2003 | Chiappetta et al. ........ 280/87.01 |
| D483,419 S | 12/2003 | Chiappetta et al. |
| 6,733,026 B1 | 5/2004 | Robberson et al. |
| 6,845,991 B1 | 1/2005 | Ritucci et al. |
| 6,871,863 B2 | 3/2005 | Michelau |
| 6,893,030 B2 | 5/2005 | Shapiro |
| 6,916,028 B2 | 7/2005 | Shapiro |
| 6,932,365 B2 * | 8/2005 | Chiappetta et al. ....... 280/47.371 |
| 7,017,939 B2 | 3/2006 | Darling, III |
| 7,066,485 B2 | 6/2006 | Shapiro |
| 7,097,182 B1 | 8/2006 | Liu |
| 7,118,115 B2 | 10/2006 | Abel |
| 7,150,465 B2 | 12/2006 | Darling, III |
| 7,226,059 B1 | 6/2007 | Samuels |
| D547,391 S | 7/2007 | Johnson et al. |
| D547,812 S | 7/2007 | Seckel et al. |
| D566,200 S | 4/2008 | Seckel et al. |
| D570,424 S | 6/2008 | Blair |
| D573,663 S | 7/2008 | Ogawa |
| 7,392,994 B2 | 7/2008 | Darling, III |
| 7,407,177 B2 | 8/2008 | Darling, III |
| 7,445,228 B2 | 11/2008 | Henry |
| 7,461,857 B2 | 12/2008 | Darling, III |
| 7,475,900 B2 | 1/2009 | Cheng |
| 7,487,977 B2 * | 2/2009 | Johnson ............... 280/47.34 |
| 7,497,449 B2 | 3/2009 | Logger |
| 7,523,955 B2 | 4/2009 | Blair |
| 7,547,037 B2 | 6/2009 | Poppinga et al. |
| 7,562,897 B1 | 7/2009 | Sherman et al. |
| 7,661,156 B2 | 2/2010 | Thorne et al. |
| 7,703,795 B2 | 4/2010 | Williamson |
| 7,731,221 B2 | 6/2010 | Bess |
| 7,775,530 B2 | 8/2010 | Darling, III |
| 7,798,500 B2 | 9/2010 | DenBoer |
| 7,823,906 B2 | 11/2010 | Darling, III |
| 7,836,530 B2 | 11/2010 | Thorne et al. |
| D643,344 S | 8/2011 | Barenbrug |
| D643,345 S | 8/2011 | Barenbrug |
| D643,346 S | 8/2011 | Barenbrug |
| D643,786 S | 8/2011 | Barenbrug |
| D644,022 S | 8/2011 | Barenbrug et al. |
| 8,011,686 B2 | 9/2011 | Chen et al. |
| 8,060,959 B2 | 11/2011 | Thorne et al. |
| 8,091,916 B2 | 1/2012 | Shapiro |
| 8,191,907 B2 * | 6/2012 | Watson ............... 280/30 |
| 8,220,824 B2 | 7/2012 | Chen et al. |
| 8,297,642 B2 | 10/2012 | Tyson, III |
| 8,388,015 B2 | 3/2013 | Chen |
| 8,458,829 B2 | 6/2013 | Thorne et al. |
| D693,573 S | 11/2013 | Holefleisch |
| 8,641,057 B2 * | 2/2014 | Herlitz et al. ............ 280/47.18 |
| 8,696,000 B1 | 4/2014 | Chen |
| 8,756,727 B2 | 6/2014 | Thorne et al. |
| 8,851,503 B2 | 10/2014 | Tyson |
| 8,899,615 B2 | 12/2014 | Dijkstra |
| 8,955,175 B2 | 2/2015 | Wiegmann et al. |
| 2003/0025301 A1 | 2/2003 | Banuelos, III |
| 2004/0164512 A1 | 8/2004 | Gunter et al. |
| 2006/0119056 A1 | 6/2006 | Olsen |
| 2007/0013167 A1 | 1/2007 | Henry |
| 2007/0284900 A1 | 12/2007 | Sze |
| 2009/0066114 A1 | 3/2009 | Molton |
| 2009/0315299 A1 | 12/2009 | Barenbrug |
| 2010/0140902 A1 | 6/2010 | Zehfuss |
| 2011/0025005 A1 | 2/2011 | Howell |
| 2011/0204598 A1 | 8/2011 | Stevenson |
| 2012/0235372 A1 | 9/2012 | Herlitz et al. |
| 2012/0274052 A1 | 11/2012 | Zhu |
| 2012/0292952 A1 | 11/2012 | Tyson, III |

FOREIGN PATENT DOCUMENTS

| | | |
|---|---|---|
| WO | WO2010/050804 | 5/2010 |
| WO | WO2014/009261 | 1/2014 |

OTHER PUBLICATIONS

Radio Flyer Pathfinder: Retrieved on Nov. 12, 2010 from http://www.amazon.com/Radio-Flyer-Pathfinder-Wagon%C2%AE-Red/dp/B0000859QK%3FSubscriptionId%3DAKIAIQF34XORTUHIVHHA%26tag%3Dlowestpricesusa-20%26linkCode%3Dxm2%26camp%3D2025%26creative%3D165953%26creativeASIN%3DB0000859QK.

* cited by examiner

MULTIPURPOSE WAGON

CROSS-REFERENCE TO RELATED APPLICATIONS

This application claims the benefit of U.S. Provisional Patent Application No. 61/880,480, filed Sep. 20, 2013, which is expressly incorporated herein by reference and made a part hereof.

FEDERALLY SPONSORED RESEARCH OR DEVELOPMENT

Not Applicable.

TECHNICAL FIELD

The present disclosure generally relates to a multipurpose wagon. In particular, a multipurpose wagon is provided with movable components that allow the wagon to be easily configured for carrying passengers, as a flatbed and for bench seating.

BACKGROUND OF THE INVENTION

Wagons, including wagons with seats, are well known in the art. While such wagons according to the prior art provide a number of advantages, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a multipurpose wagon that has a removable panel and where the removed panel can be joined to an existing sidewall of the wagon to increase the height and thickness of the existing sidewall.

The disclosed subject technology further relates to a multipurpose wagon, comprising a wagon body including a front portion and a rear portion; a handle coupled to the front portion; a front wall adjacent the front portion; a rear wall adjacent the rear portion; a first sidewall extending between the front wall and the rear wall along one side of the wagon body; a second sidewall extending between the front wall and the rear wall along an opposing side of the wagon body, wherein the first sidewall has a panel that is removable from the first side of the wagon body and connectable to the second sidewall of the wagon body.

The disclosed subject technology further relates to a multipurpose wagon where the removable panel has a tab extending therefrom, and where the second sidewall has a receptacle for receiving the tab to secure the removable panel to the second sidewall.

The disclosed subject technology further relates to a multipurpose wagon where the second sidewall has a first height in a first configuration of the wagon, and where the second sidewall has a second height when the removable panel is connected to the second sidewall. The second height being greater than the first height.

The disclosed subject technology further relates to a multipurpose wagon having a rear backrest coupled to the rear portion of the wagon body and a front backrest coupled to the front portion of the wagon body. The front and rear backrests are configured to be disposed in one of a substantially upright position and a substantially flat position.

The disclosed subject technology further relates to a multipurpose wagon where the second sidewall has a lower portion with a first thickness, an upper portion with a second thickness less than the first thickness, and a shoulder at the joint between the lower portion and the upper portion. In one embodiment, the shoulder has a receptacle for receiving the removable panel. In this configuration an inner surface of the lower portion of the second sidewall and an inner surface of the removable panel are substantially flush to create a backrest along the side of the wagon.

The disclosed subject technology further relates to a multipurpose wagon having a first seat located at the front portion of the wagon body and interior of the front wall, and a second seat located at the rear portion of the wagon body and interior of the rear wall.

The disclosed subject technology further relates to a multipurpose wagon having a foot well between the first seat and the second seat. In one embodiment, the foot well has a floor that is positioned lower than the first seat and the second seat.

The disclosed subject technology further relates to a multipurpose wagon comprising: a wagon body including a front portion and a rear portion; a handle coupled to the front portion; a front wall adjacent the front portion; a rear wall adjacent the rear portion; a first sidewall extending between the front wall and the rear wall along one side of the wagon body; a second sidewall extending between the front wall and the rear wall along an opposing side of the wagon body, wherein the second sidewall has a receptacle for receiving tabs from a removable panel of the wagon, an overall height of the second sidewall being increased when the panel is connected thereto.

The disclosed subject technology further relates to a multipurpose wagon comprising: a wagon body including a front portion and a rear portion; a handle coupled to the front portion; a front wall adjacent the front portion; a rear wall adjacent the rear portion; a rear backrest coupled to the rear portion of the wagon body and a front backrest coupled to the front portion of the wagon body, wherein the front and rear backrests are configured to be disposed in one of a substantially upright position and a substantially flat position; a first sidewall extending between the front wall and the rear wall along one side of the wagon body; a second sidewall extending between the front wall and the rear wall along an opposing side of the wagon body, wherein a panel is removable from the first side of the wagon body and connectable to the second sidewall of the wagon body when the rear backrest and the front backrest are in the substantially upright position.

The disclosed subject technology further relates to a multipurpose wagon where the removable panel has a tab extending therefrom, and where the second sidewall has a receptacle for receiving the tab to secure the removable panel to the second sidewall.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
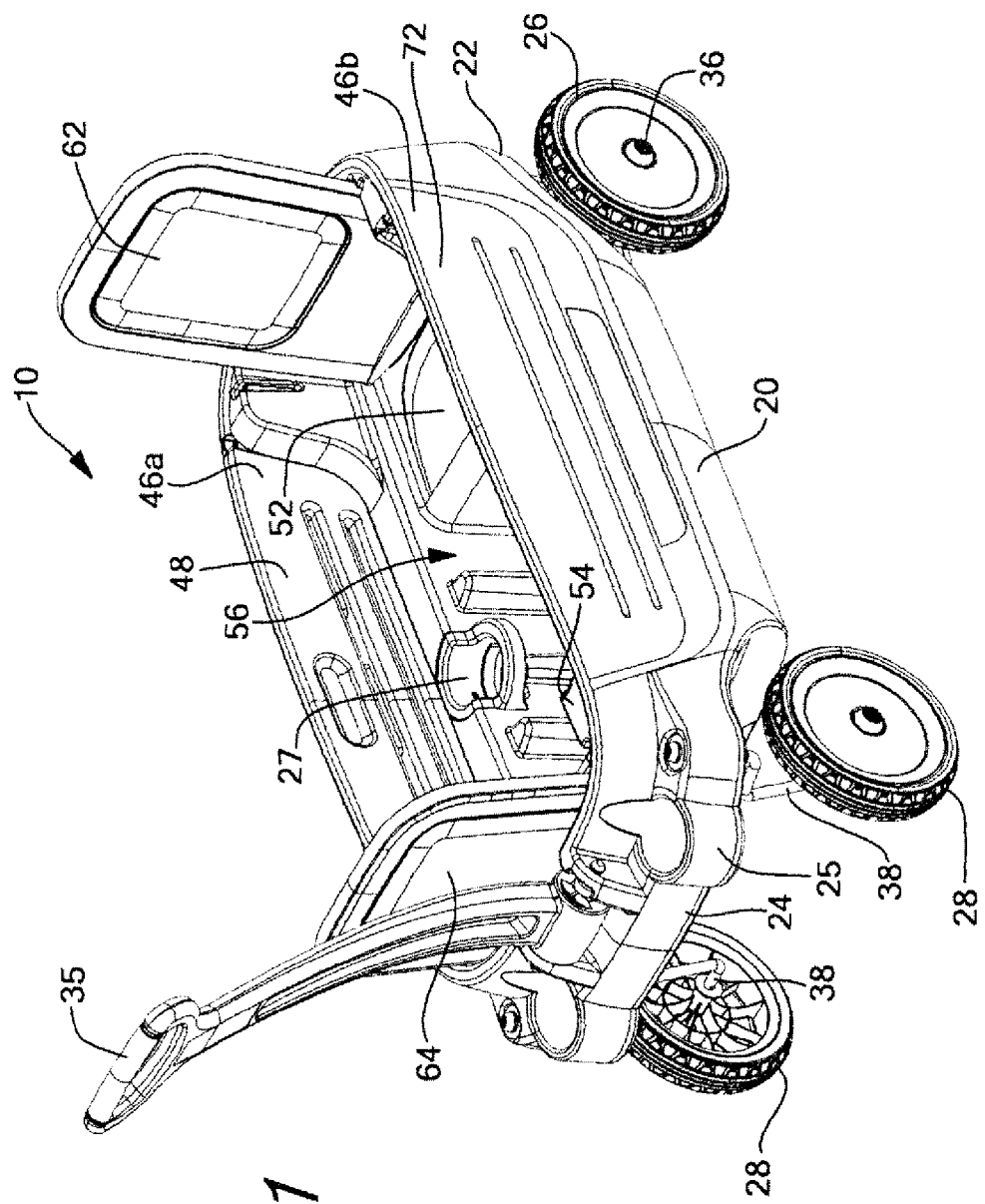
FIG. 1 is a perspective view of a configuration of a multipurpose wagon according to one embodiment.

While the multipurpose wagon discussed herein is susceptible of embodiments in many different forms, there is shown in the drawings, and will herein be described in detail, preferred embodiments with the understanding that the present description is to be considered as an exemplification of the principles of the multipurpose wagon and are not intended to limit the broad aspects of the disclosure to the embodiments illustrated.

The multipurpose wagon is a product that can be used by children, adolescents and adults. For example, the multipurpose wagon can be provided with configurable components to allow different uses of the multipurpose wagon. In one configuration, the multipurpose wagon may have one or two backrests in upright positions and a cavity for placement of feet, allowing passengers to comfortably ride in the multipurpose wagon. In another configuration, the backrests may be folded down in flat positions, allowing the wagon to be used as a flatbed carrier with a storage compartment below. In yet another configuration, a panel may be removed from one side of the multipurpose wagon and inserted into another side of the multipurpose wagon, thereby acting as an extended sidewall or backrest for a bench seating arrangement of the multipurpose wagon.

Figures 2, 8:
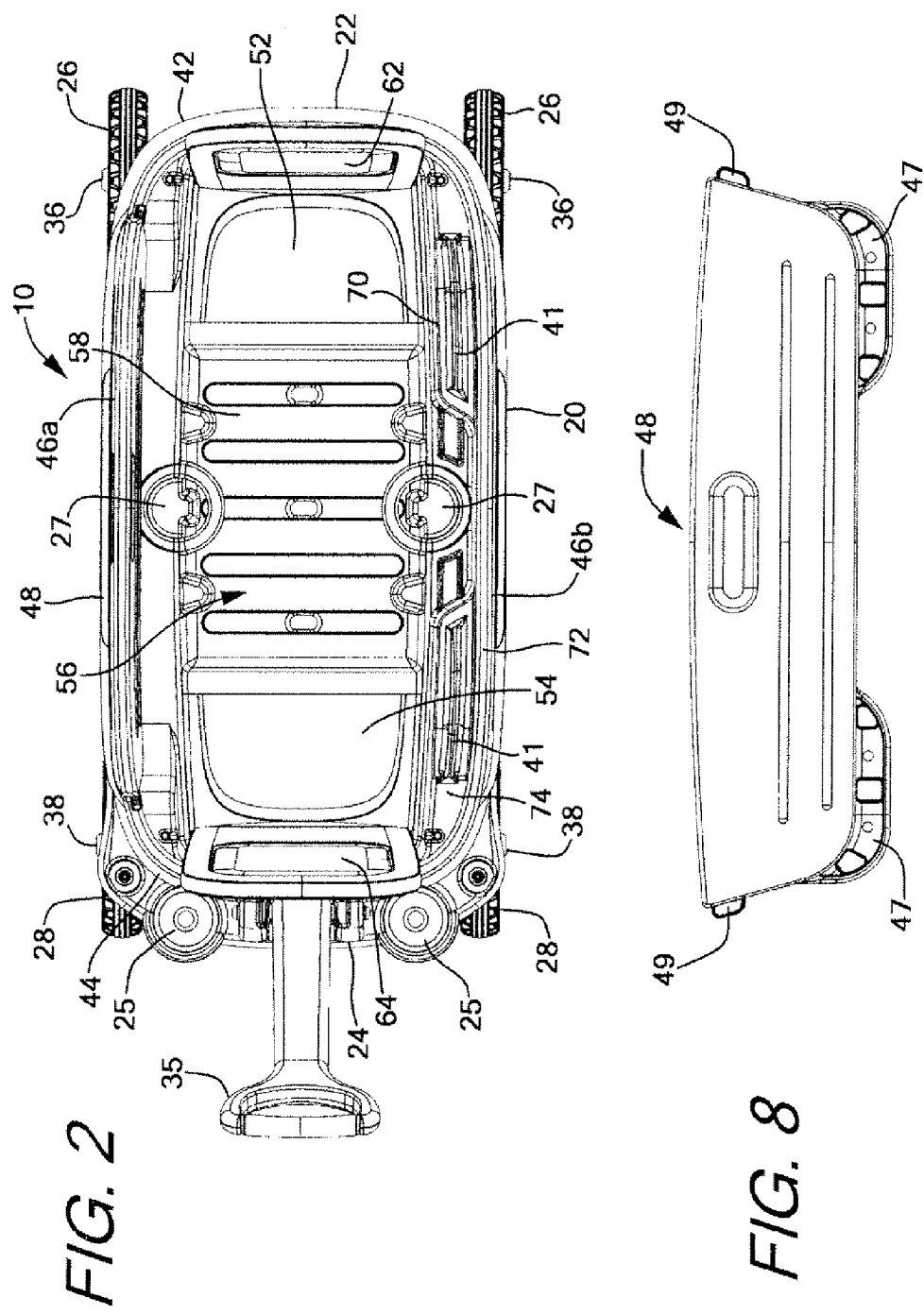
FIG. 2 is a top plan view of the configuration of the multipurpose wagon shown in FIG. 1.
FIG. 8 is a front elevation view of an embodiment of a removable side panel.

Referring now to FIGS. 1 and 2, in one embodiment the multipurpose wagon 10 includes a body 20, rear wheels 26 supporting a rear portion 22 of the body 20, and front wheels 28 supporting a front portion 24 of the body 20. In one embodiment, each of the rear wheels 26 is rotatably supported by first axles 36, and each of the front wheels 28 is rotatably supported by second axles 38. Each of the rear wheels 26 may be supported by individual first axles 36, or preferably both rear wheels 26 may be supported by a single axle. Similarly, both front wheels 28 may be supported by a single axle, or preferably, each of the front wheels 28 may be supported by individual rotatable second axles 38.

Body 20 further includes first retention cavities 25 disposed or located at the front portion 24 and second retention cavities 27 disposed or located in a central area of body 20. The first and second retention cavities 25, 27 are configured to provide storage and/or retention of cups, bottles and the like (e.g., cup holders). In one embodiment the first retention cavities 25 are located on an outer wall of the body 20, and the second retention cavities 27 are located on an inner wall of the body 20. Front portion 24 of the body 20 provides a connection to handle 35. Handle 35 is configured to allow the multipurpose wagon 10 to be maneuvered by a person (e.g., pulled or pushed by an adult or a child).

As further shown in FIGS. 1-4, the body 20 includes a rear wall 42 adjacent the rear portion 22, a front wall 44 adjacent the front portion 24, a first sidewall 46a extending between the front wall 44 and the rear wall 42 along one side of the wagon body 20, and a second sidewall 46b extending between the front wall 44 and the rear wall 42 along an opposing side of the wagon body 20. Rear, front and first and second sidewalls 42, 44, 46a, 46b may be integrally formed with body 20. Alternatively, any of rear, front and first and second sidewalls 42, 44, 46a, 46b may be individual components connected or fastened to body 20. Body 20 further includes a front or first seat 54 located in the front portion 24 of the wagon body 20 and interior of the front wall 44, a rear or second seat 52 located in the rear portion 22 of the wagon body 20 and interior of the rear wall 42, a cavity 56 and a floor 58, allowing two passengers to comfortably sit in the multipurpose wagon 10. For example, two passengers (e.g., children) can sit in the multipurpose wagon 10, one passenger facing rearwards while seated on front seat 54 and the other passenger facing forward while seated on rear seat 52. Both passengers' legs may extend into foot well or cavity 56 that is located between the first seat 54 and the second seat 52, and either or both passengers' feet may rest on floor 58, wherein the floor 58 is positioned lower than the first seat 54 surface and the second seat 52 surface. Thus, passengers may sit in the multipurpose wagon 10 as they would typically sit in a chair, eliminating the need to sit cross-legged on a wagon floor.

Multipurpose wagon 10 also includes a front backrest 64 coupled to the front portion 24 of the wagon body 20, and a rear backrest 62 coupled to the rear portion 22 of the wagon body 20. Each of front and rear backrests 64, 62 are preferably independently pivotably connected to body 20 and/or front and rear seats 54, 52 respectively. For example, the front and rear backrests 64, 62 may be pivoted up (e.g., pulled up) into a vertical position and pivoted down (e.g., pushed down) into a flat or horizontal position. Alternatively, either one or both of front and rear backrests 64, 62 may be removable from multipurpose wagon 10. For example, front and rear backrests 64, 62 may be independent configured in the multipurpose wagon 10 to be disposed in one of an upright position (see FIG. 1), in the flat or horizontal position (see FIG. 5) or removed (not shown) from the multipurpose wagon 10.

Figure 3:
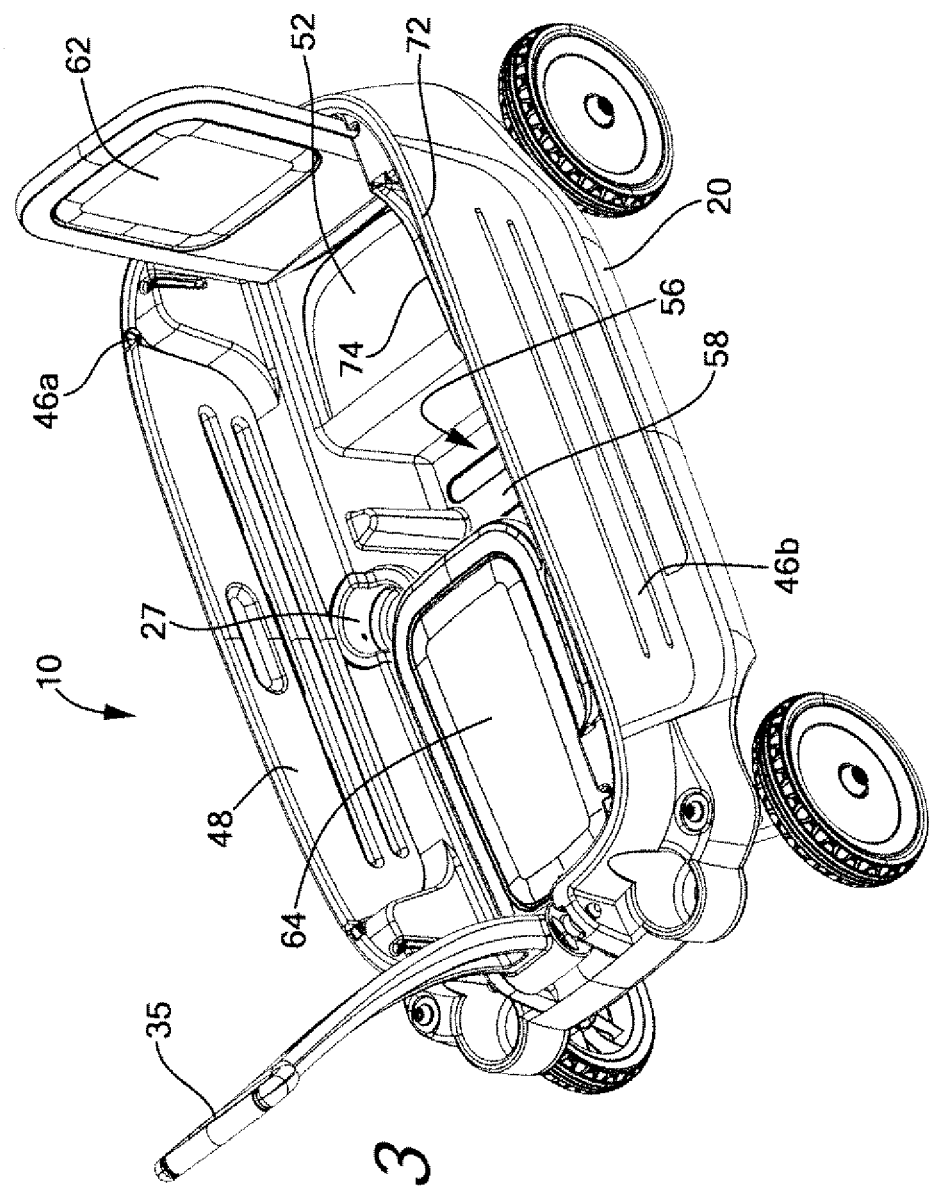
FIG. 3 is a perspective view of another configuration of the multipurpose wagon of FIG. 1.
Figure 4:
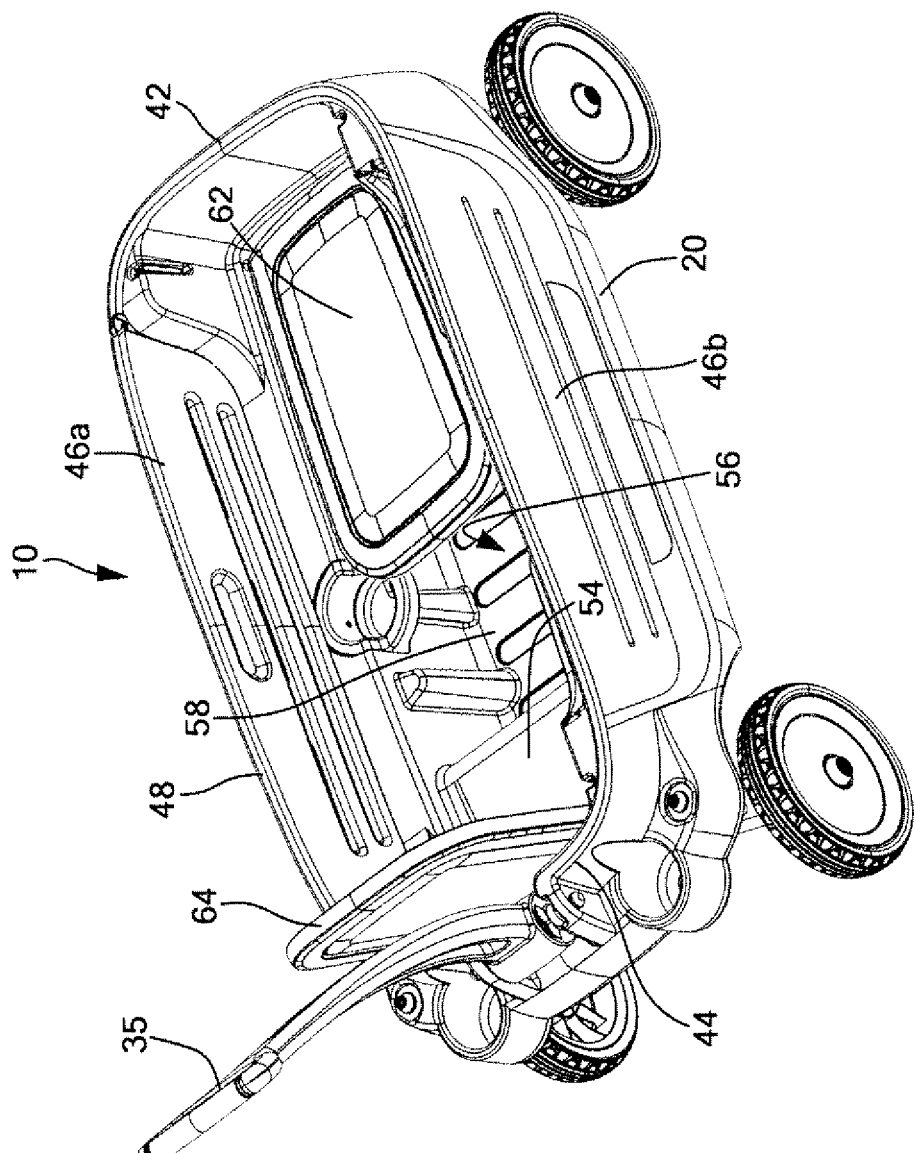
FIG. 4 is a perspective view of another configuration of the multipurpose wagon of FIG. 1.
Figure 5:
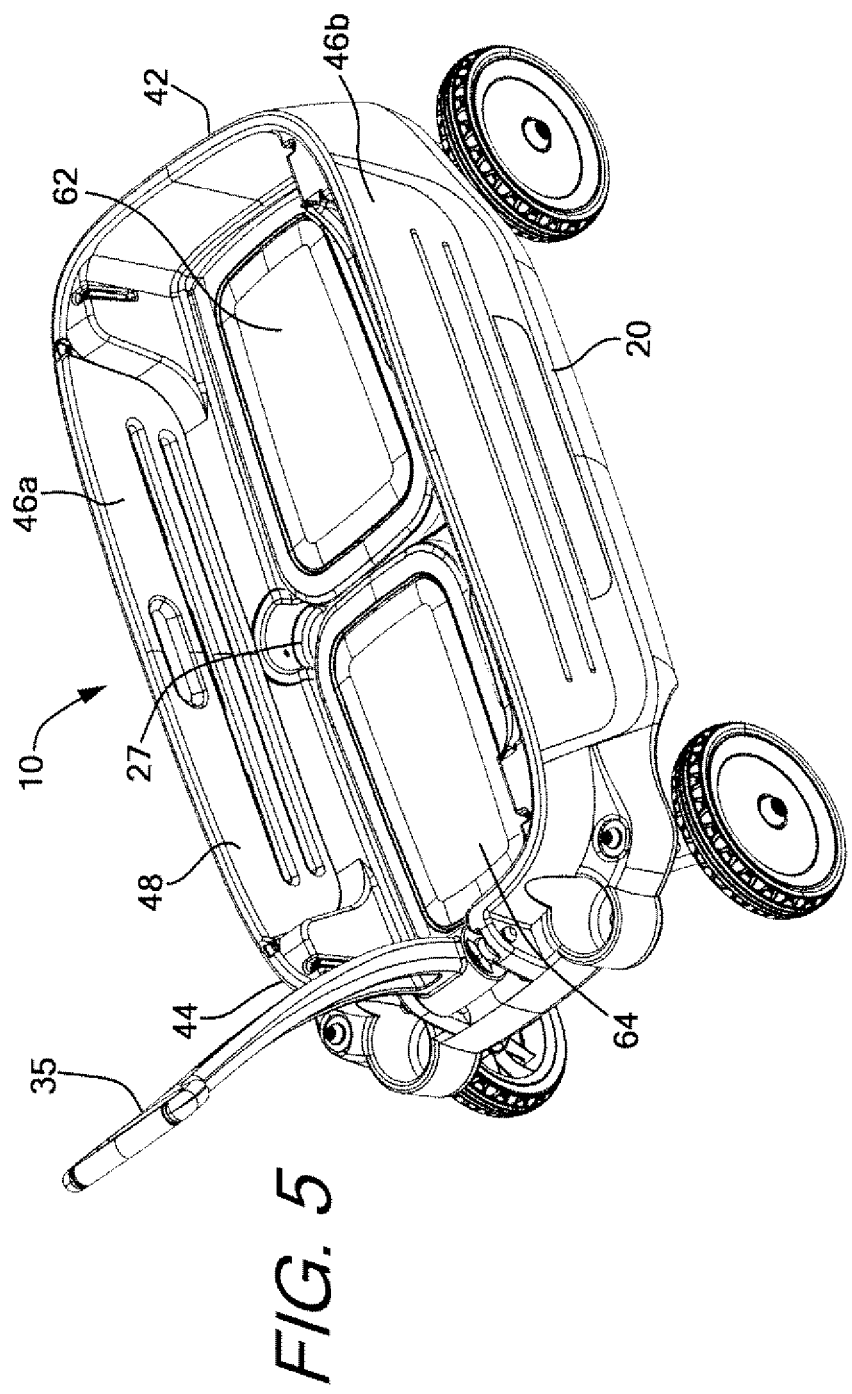
FIG. 5 is a perspective view of another configuration of the multipurpose wagon of FIG. 1.

As best shown in FIG. 1, each of front and rear backrests 64, 62 may be positioned in an upright (e.g., open) position, acting as a backrest for the corresponding front and rear seats 54, 52. For example, a passenger sitting in the front seat 54 may lean back against the front backrest 64 and a passenger sitting in the rear seat 52 may lean back against the rear backrest 62. As best shown in FIG. 5, each of front and rear backrests 64, 62 may be positioned in a downward or flat position, covering each of the corresponding front and rear seats 54, 52, thereby acting as a flatbed 66 (e.g., raised floor) of the multipurpose wagon 10. Having front and rear backrests 64, 62 in the flat position effectively closes off cavity 56, allowing cavity 56 to be a storage compartment, for example. Front and rear backrests 64, 62 may be sized and shaped so that second retention cavities 27 are still accessible when either or both of front and rear backrests 64, 62 are in the flat (e.g., closed) position, as seen in FIGS. 3-5.

Varying the positioning of front and rear backrests 64, 62 allows the multipurpose wagon 10 to be configured in other ways. For example, as shown in FIG. 3, rear backrest 62 may be positioned vertically and front backrest 64 may be positioned horizontally, thereby allowing a passenger to comfortably ride in rear portion 22 of multipurpose wagon 10. In this configuration, the portion of cavity 56 underneath front backrest 64 may be used as a storage area or for extra foot room and the top surface of front backrest 64 may be used as a work surface (e.g., desk, place to set toys, footrest). A reverse configuration of multipurpose wagon 10 is shown in FIG. 4.

Figure 6:
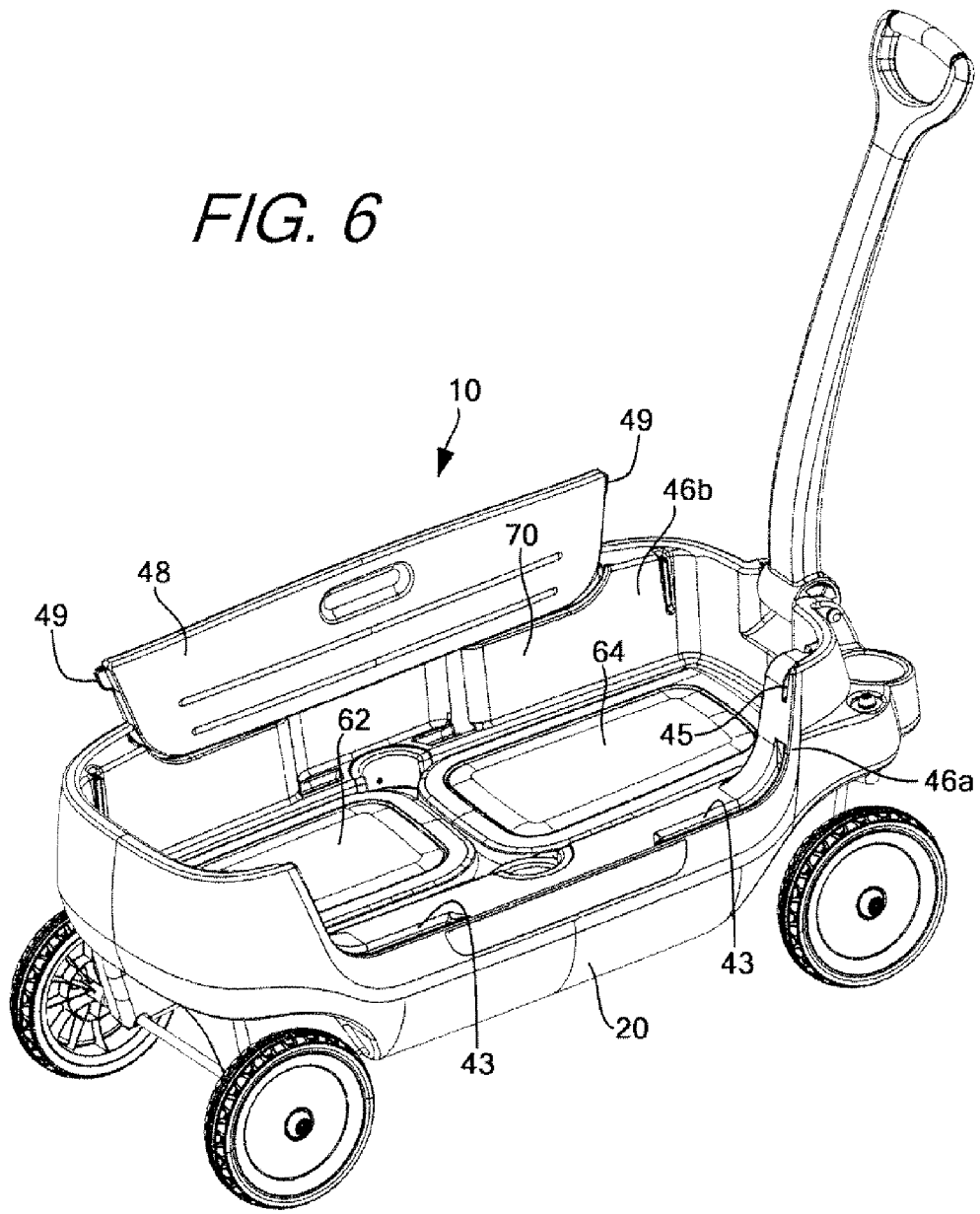
FIG. 6 is a perspective view of another configuration of the multipurpose wagon of FIG. 1.
Figure 7:
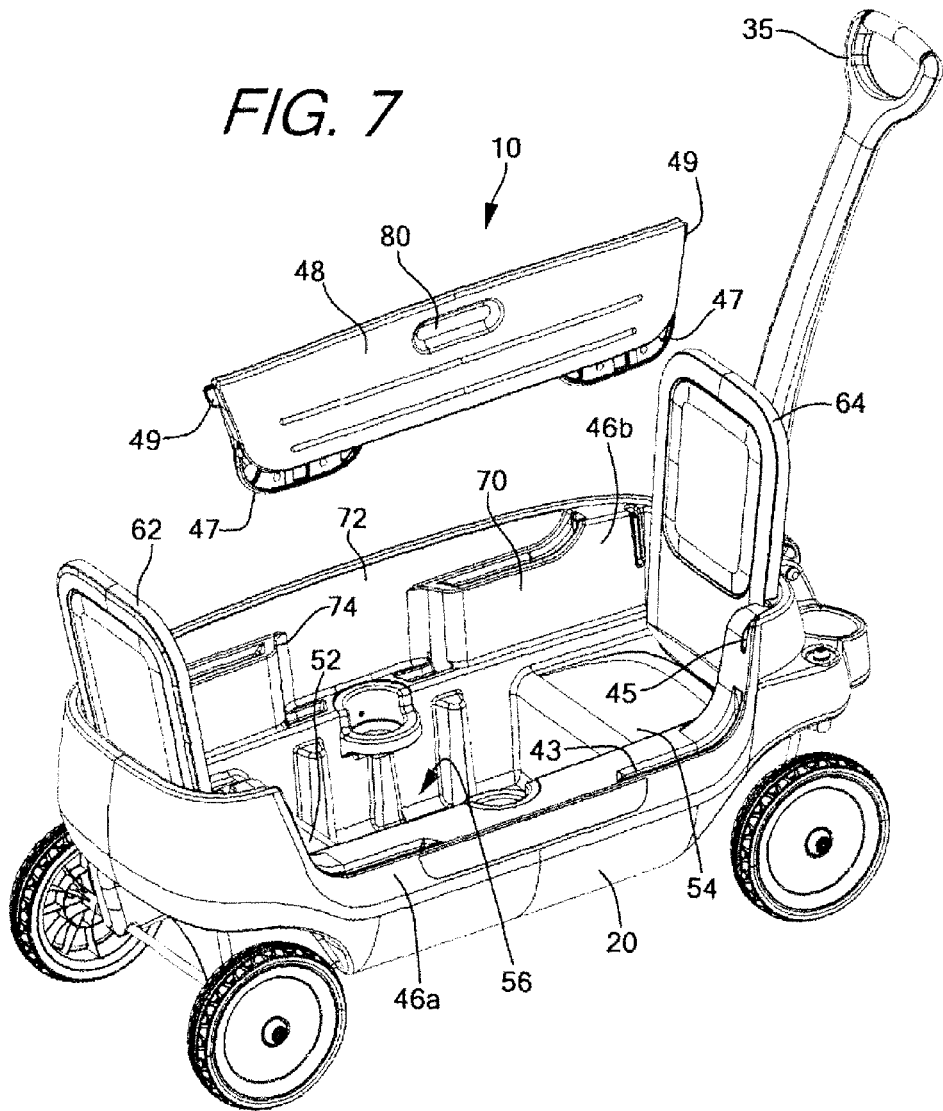
FIG. 7 is a perspective view of another configuration of the multipurpose wagon of FIG. 1

As best shown in FIGS. 6-8, in one embodiment one or more wall panels 48 of a wall of the body 20, such as walls 42, 44, 46a or 46b, may be a removable panel. For example, in one embodiment sidewall panel 48 can be removed from the first side of the wagon body 20 and connected to the second sidewall 46b and used as an extension adjacent the second sidewall 46b (e.g., as an extended height backrest).

In one embodiment wall panel 48 includes first tabs 47 and second tabs 49 (see FIG. 8) extending therefrom that are sized and shaped to mate or engage with corresponding first tab receptacles 43 and second tab receptacles 45 in body 20 (see FIG. 6) when wall panel 48 is configured as a first sidewall of multipurpose wagon 10 (see FIG. 1). The interoperation of the first tabs 47 in the first tab receptacles 43, and the second tabs 49 in the second tab receptacles 45, operate to removably fix the wall panel 48 to the body 20 as the first sidewall 46a. The body 20 of the wagon 10 includes third tab receptacles 41 (see FIG. 2), preferably interior of the second sidewall 46b, that are sized and shaped to mate with first tabs 47 when wall panel 48 is configured as an extended backrest of second sidewall 46b (see FIG. 6). When the wall panel 48 is connected to the second side wall 46b as it is in FIGS. 6 and 7, the inner surface 76 of the lower portion 70 of the second sidewall 46b and the inner surface 78 of the wall panel 48 are substantially flush to create a backrest. In addition, wall panel 48 may be removed entirely from the body 20 and not used as part of multipurpose wagon 10.

In one embodiment, as shown in FIGS. 1, 2 and 7, the second sidewall 46b has a lower portion 70 with a first thickness between an outside wall of the wagon body 20 and an inside wall of the wagon body 30, and an upper portion 72 with a second thickness between an outside wall of the wagon body and an inside wall of the wagon body 30. As seen in these figures, the thickness of the upper portion 72 is less than the thickness of the lower portion 70. A shoulder 74, which can also be used as an armrest for a rider in the wagon 10, joins the lower portion 70 and the upper portion 72. In one embodiment the third tab receptacles 41 that receive the first tabs 47 of the removable wall panel 48 are located in the shoulder 74 portion of the second sidewall 46b. Similarly, the second sidewall 46b has a first height in the first configuration of the wagon 10 as shown in FIG. 1-5 where the removable wall panel 48 is either connected to the first sidewall 46a or is removed from the wagon 10. When the removable wall panel 48 is connected to the second sidewall as shown in FIG. 6, the second sidewall 46b now has a second height that extends to the top of the removable wall panel 48. As is clear from the figures, the second height is greater than the first height. Because the wall panel 48 is completely removable from the wagon body 20, the wall panel 48 can be removed from the first side of the wagon body 20 and connected to the second side of the wagon body when the front and rear backrests 64, 62 are in the up substantially upright position. The removable wall panel 48 also has a handle 80 to assist in removing, inserting and storing the panel 48.

As shown in FIG. 6, when the front and rear backrests 64, 62 are positioned in the downward position the wagon 10 is configured in the bench configuration. In the bench configuration the rear backrest 62 and the front backrest 64 form the floor of the wagon. Further, as shown in FIG. 6, when wall panel 48 is removed from the first sidewall 46a and placed in connection with the second sidewall 46b, a raised or extended height sidewall is provided to operate as a backrest for a person sitting sideways in the wagon 10.

Additional configurations of multipurpose wagon 10 may be used by varying the positions of front and rear backrests 64, 62 and wall panel 48. For example, as shown in FIG. 7, wall panel 48 may be mounted on the second sidewall 46b and both front and rear backrests 64, 62 may be positioned in the upright position. Thus, the multipurpose wagon 10 provides a variety of configurations of vehicles and devices by simply repositioning the front and rear backrests 64, 62 and the wall panels 48 as desired. Such versatility eliminates the need to have several types of wagons or carts, thereby minimizing cost and storage requirements.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A multipurpose wagon, comprising:
    a wagon body including a front portion and a rear portion;
    a handle coupled to the front portion;
    a front wall adjacent the front portion;
    a rear wall adjacent the rear portion;
    a first sidewall extending between the front wall and the rear wall along one side of the wagon body;
    a second sidewall extending between the front wall and the rear wall along an opposing side of the wagon body, wherein the first sidewall has a panel that is removable from the first sidewall of the wagon body and connectable to the second sidewall of the wagon body, wherein the first sidewall has a first height with the panel connected to the first sidewall, wherein the second sidewall has a first height with the panel connected to the first sidewall, the first height of the first sidewall being generally the same as the first height of the second sidewall when the panel is connected to the first sidewall, and wherein the second sidewall has a second height when the panel is removed from the first sidewall and connected to the second sidewall, the second height of the second sidewall being greater than the first height of the second sidewall.

2. The multipurpose wagon of claim 1, wherein the removable panel has a tab extending therefrom, and wherein the second sidewall has a receptacle for receiving the tab to secure the removable panel to the second sidewall.

3. The multipurpose wagon of claim 1, wherein a portion of the first sidewall has a second height when the panel is removed from the first sidewall and connected to the second sidewall, the second height of the first sidewall being less than the first height of the first sidewall.

4. The multipurpose wagon of claim 1, further comprising a rear backrest coupled to the rear portion of the wagon body and a front backrest coupled to the front portion of the wagon body, wherein the front and rear backrests are configured to be disposed in one of a substantially upright position and a substantially flat position.

5. The multipurpose wagon of claim 4, wherein the rear backrest and the front backrest also form floors for the wagon.

6. The multipurpose wagon of claim 1, wherein the second sidewall has a lower portion with a first thickness, an upper portion with a second thickness less than the first thickness, and a shoulder at the joint between the lower portion and the upper portion.

7. The multipurpose wagon of claim 6, wherein the shoulder has a receptacle for receiving the removable panel, and wherein an inner surface of the lower portion of the second sidewall and an inner surface of the removable panel are substantially flush to create a backrest.

8. The multipurpose wagon of claim 1, further comprising a first seat located at the front portion of the wagon body and interior of the front wall, and a second seat located at the rear portion of the wagon body and interior of the rear wall.

9. The multipurpose wagon of claim 8, further comprising a foot well between the first seat and the second seat, wherein the foot well has a floor that is positioned lower than the first seat and the second seat.

10. A multipurpose wagon, comprising:
a wagon body including a front portion and a rear portion;
a handle coupled to the front portion;
a front wall adjacent the front portion;
a rear wall adjacent the rear portion;
a first sidewall extending between the front wall and the rear wall along one side of the wagon body;
a second sidewall extending between the front wall and the rear wall along an opposing side of the wagon body, wherein the second sidewall has a receptacle for receiving tabs from a removable panel of the wagon to connect thereto, an overall height of the second sidewall being increased when the removable panel is connected thereto; and,
a first seat located at the front portion of the wagon body and interior of the front wall, a second seat located at the rear portion of the wagon body and interior of the rear wall, and a foot well between the first seat and the second seat, wherein the foot well has a floor that is positioned lower than the first seat and the second seat.

11. The multipurpose wagon of claim 10, wherein the removable panel is removable from the first side of the wagon body and connectable to the second sidewall of the wagon body.

12. The multipurpose wagon of claim 10, further comprising a rear backrest coupled to the rear portion of the wagon body and a front backrest coupled to the front portion of the wagon body, wherein the front and rear backrests are configured to be disposed in one of a substantially upright position and a substantially flat position.

13. A multipurpose wagon, comprising:
a wagon body including a front portion and a rear portion;
a handle coupled to the front portion;
a front wall adjacent the front portion;
a rear wall adjacent the rear portion;
a rear backrest coupled to the rear portion of the wagon body and a front backrest coupled to the front portion of the wagon body, wherein the front and rear backrests are configured to be disposed in one of a substantially upright position and a substantially flat position;
a first sidewall extending between the front wall and the rear wall along one side of the wagon body;
a second sidewall extending between the front wall and the rear wall along an opposing side of the wagon body, wherein a panel is removable from the first side of the wagon body and connectable to the second side of the wagon body when the rear backrest and the front backrest are in the substantially upright position, wherein the second sidewall has a lower portion with a first thickness, an upper portion with a second thickness less than the first thickness, and a shoulder at the joint between the lower portion and the upper portion, and wherein the shoulder has a receptacle for receiving the panel to create a backrest.

14. The multipurpose wagon of claim 13, wherein the panel has a tab extending therefrom, and wherein the second sidewall has a receptacle for receiving the tab to secure the panel to the second sidewall.

15. The multipurpose wagon of claim 13, wherein the second sidewall has a first height in a first configuration of the wagon, and wherein the second sidewall has a second height when the panel is connected to the second sidewall, the second height being greater than the first height.

16. The multipurpose wagon of claim 13, wherein an inner surface of the lower portion of the second sidewall and an inner surface of the panel are substantially flush.

* * * * *